United States Patent
Lai

(10) Patent No.: US 7,083,473 B1
(45) Date of Patent: Aug. 1, 2006

(54) CARD CONNECTOR CAPABLE OF AVOIDING ERRONEOUS INSERTION OF ELECTRONIC CARD

(75) Inventor: Yaw-Huey Lai, Taipei (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/287,426

(22) Filed: Nov. 28, 2005

(30) Foreign Application Priority Data

Sep. 2, 2005 (TW) .............................. 94215162 U

(51) Int. Cl.
*H01R 24/00* (2006.01)
(52) U.S. Cl. ..................................... 439/630
(58) Field of Classification Search ............... 439/630, 439/633
See application file for complete search history.

(56) References Cited

U.S. PATENT DOCUMENTS 6,746,280 B1   6/2004   Lu et al. ..................... 419/630

*Primary Examiner*—Javaid H. Nasri
(74) *Attorney, Agent, or Firm*—Bacon & Thomas

(57) ABSTRACT

A card connector includes a shell and a pressed plate. The shell has at least two receiving spaces formed therein. At least two terminal groups are mounted inside the shell. The second terminal group is located at a bottom side of a front end of the shell, having its body resiliently bending backward and upward. The pressed plate has two ends movably mounted in the shell for upward and downward movement, having a plurality of slots. The body of the second terminal group runs upward through bottom sides of the slots to be exposed outside the pressed plate. The pressed plate is supported by the body of the second terminal group, having a plurality of upright walls spaced from one another for effectively blocking various erroneous insertions of various kinds of cards, thus avoiding damage or malfunction of the card connector.

10 Claims, 12 Drawing Sheets

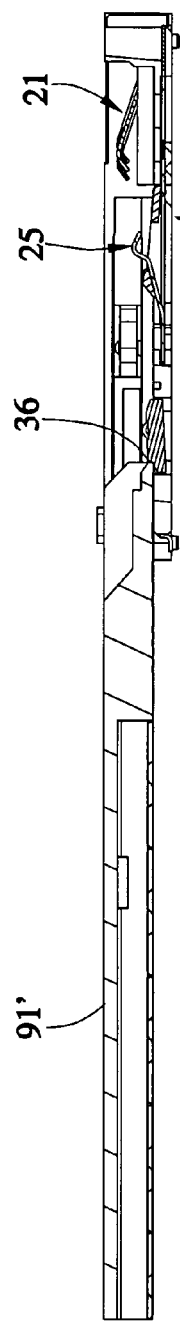
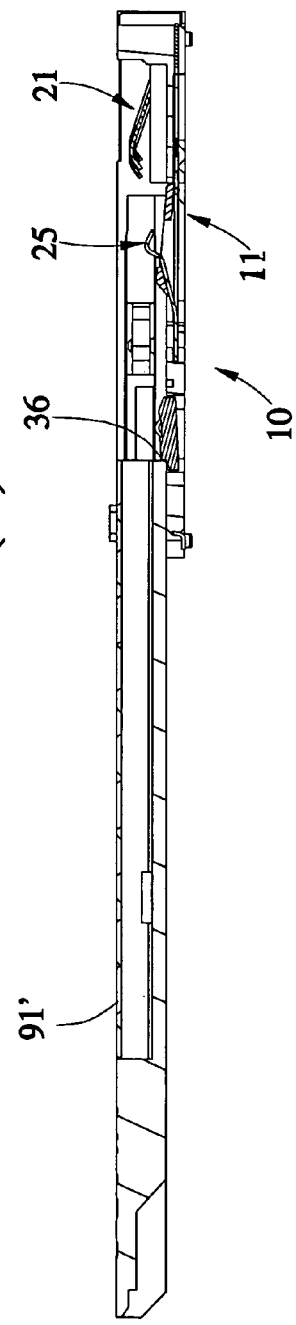
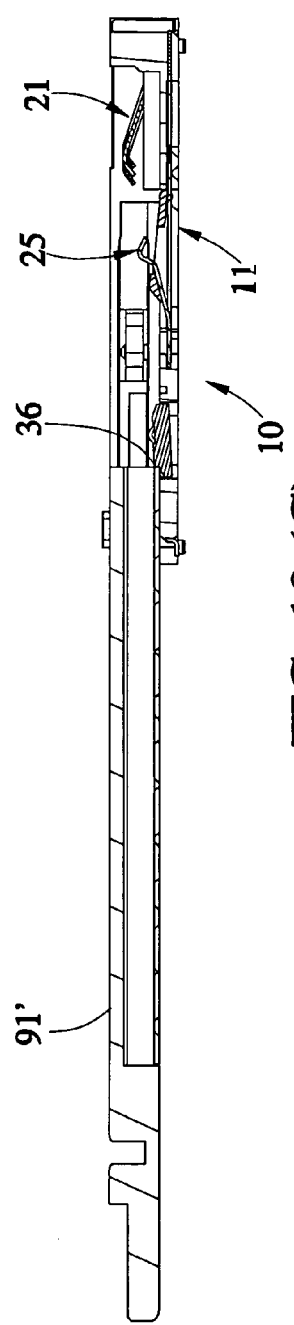
FIG. 10 (A)
FIG. 10 (B)
FIG. 10 (C)

CARD CONNECTOR CAPABLE OF AVOIDING ERRONEOUS INSERTION OF ELECTRONIC CARD

BACKGROUND OF THE INVENTION

1. Field of the Invention

The present invention relates generally to electronic apparatuses, and more particularly, to a card connector capable of avoiding erroneous insertion of an electronic card.

2. Description of the Related Art

Most of the present card connectors are structurally all-in-one to each have a shell having space therein and corresponding terminals for receiving and electronic connection with many kinds of the cards.

U.S. Pat. No. 6,746,280 disclosed a signal adaptor for memory cards as a conventional card connector, which includes a plurality of terminals therein for electronic connection with different kinds of the cards. However, while a card is inserted into the card connector in a wrong direction, e.g. erroneous insertion of the card with its rear end facing forward or its opposite side facing upward, the card probably impacts the terminals to cause damage or deformation of the terminals to further result in failure of access of the card and even worse to incur short circuit of a power terminal and other terminals and then burnout of the card connector or other external electronic apparatuses.

In light of above, the conventional all-in-one card connector must have stopping means for preventing the card inserted in the wrong direction from entering where the card impacts the terminals of the card connector or for spacing the card from the terminals to prevent the terminals from damage or deformation.

In addition, the conventional all-in-one card connector accommodates many kinds of cards, some of which partially have metal surfaces, like memory stick DUO (MS-DUO) card. While the MS-DUO card is inserted into the card connector, the metal surfaces located at bilateral sides of a bottom side of the card may touch the corresponding terminals adapted for electronic connection with the extreme digital (XD) card to cause short circuit, thus requiring a solution to such problem.

SUMMARY OF THE INVENTION

The primary objective of the present invention is to provide a card connector capable of avoiding erroneous insertion of an electronic card; the card connector can stop entry of an erroneously inserted card and prevent the card from touching terminals thereof.

The secondary objective of the present invention is to provide a card connector capable of avoiding erroneous insertion of an electronic card; the card connector can avoid short circuit incurred by touching corresponding terminals adapter for electronic connection with other cards.

The foregoing objectives of the present invention are attained by the card connector, which is composed of a shell and a pressed plate. The shell includes an opening formed at a front end thereof, and at least two receiving spaces extending inward from the opening and overlapping each other for receiving at least two kinds of cards. At least two terminal groups, two of which are defined as a first terminal group and a second terminal group, are mounted to the shell, extending into the shell. The first terminal group is located at an internal rear end of the shell for electronic connection with a first card. The second terminal group is located at a bottom side of a front end of the shell, having its body resiliently bending backward and upward for electronic connection with a second card. Each of the two terminal groups has a plurality of terminals. The pressed plate includes two ends movably mounted in the shell to enable its front edge to be moved up and down within a section, having a plurality of slots. The body of the second terminal group runs upward through a bottom side of each of the slots to be exposed outside a top side of the pressed plate to form a plurality of contact portions. The pressed plate is supported by the body of the second terminal group to be located at an upper position of the section. The front edge of the pressed plate is transversely arranged to form a plurality of upright walls spaced from one another in a predetermined interval.

The present invention can effectively block various erroneous insertions of various kinds of the cards to prevent the cards from being pushed inward to crash into the terminals and to further avoid damage or malfunction of the card connector.

In addition, the present invention teaches the technology that there is a predetermined interval formed between at lease two receiving spaces to enable a center of one of the two receiving spaces for deviation of the predetermined interval, thus preventing a normally inserted card having a metal surface from touching a power terminal of the second terminal group and further avoiding short circuit.

BRIEF DESCRIPTION OF THE DRAWINGS

FIG. 10(A) is another sectional view of the preferred embodiment of the present invention at work, showing an erroneous insertion of the first card (MS-DUO card) with its opposite side facing upward and its front end facing forward.

FIG. 10(B) is another sectional view of the preferred embodiment of the present invention at work, showing an erroneous insertion of the first card (MS-DUO card) with its front side facing upward and its rear end facing forward.

FIG. 10(C) is another sectional view of the preferred embodiment of the present invention at work, showing an erroneous insertion of the first card (MS-DUO card) with its opposite side facing upward and its rear end facing forward.

DETAILED DESCRIPTION OF PREFERRED EMBODIMENTS

Figure 1:
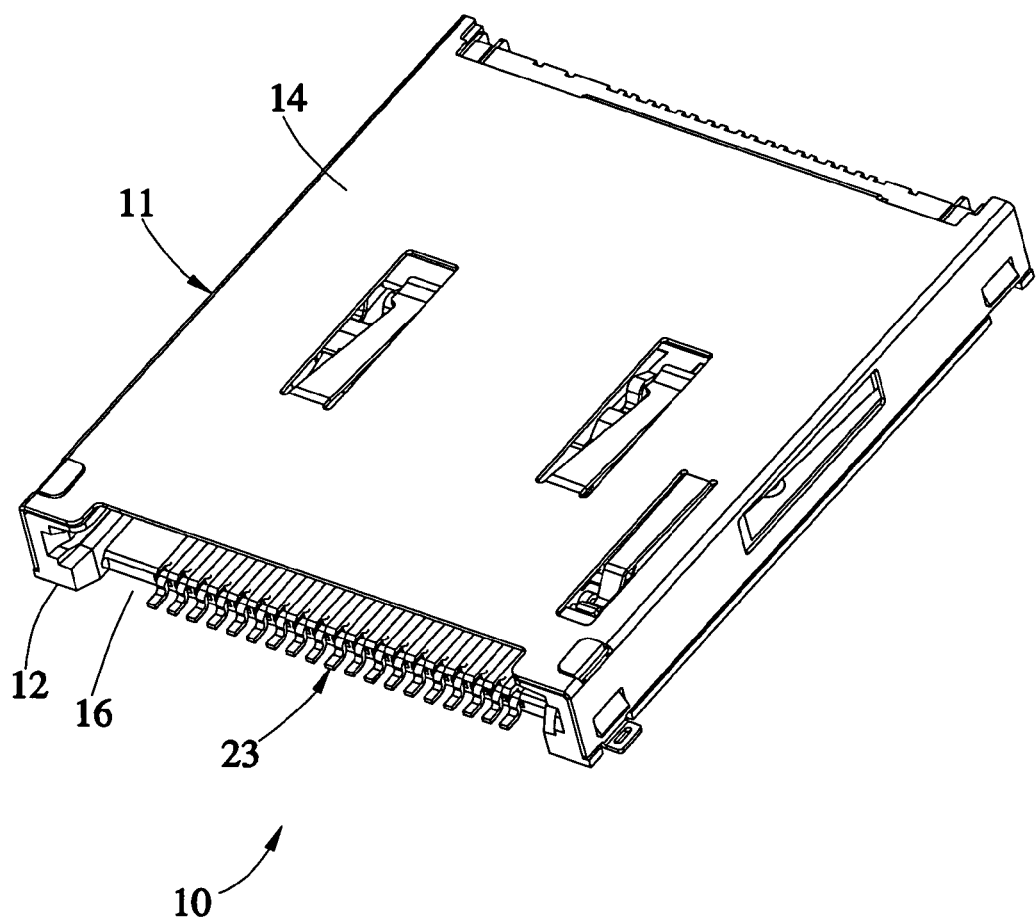
FIG. 1 is a perspective view of a preferred embodiment of the present invention.
Figure 2:
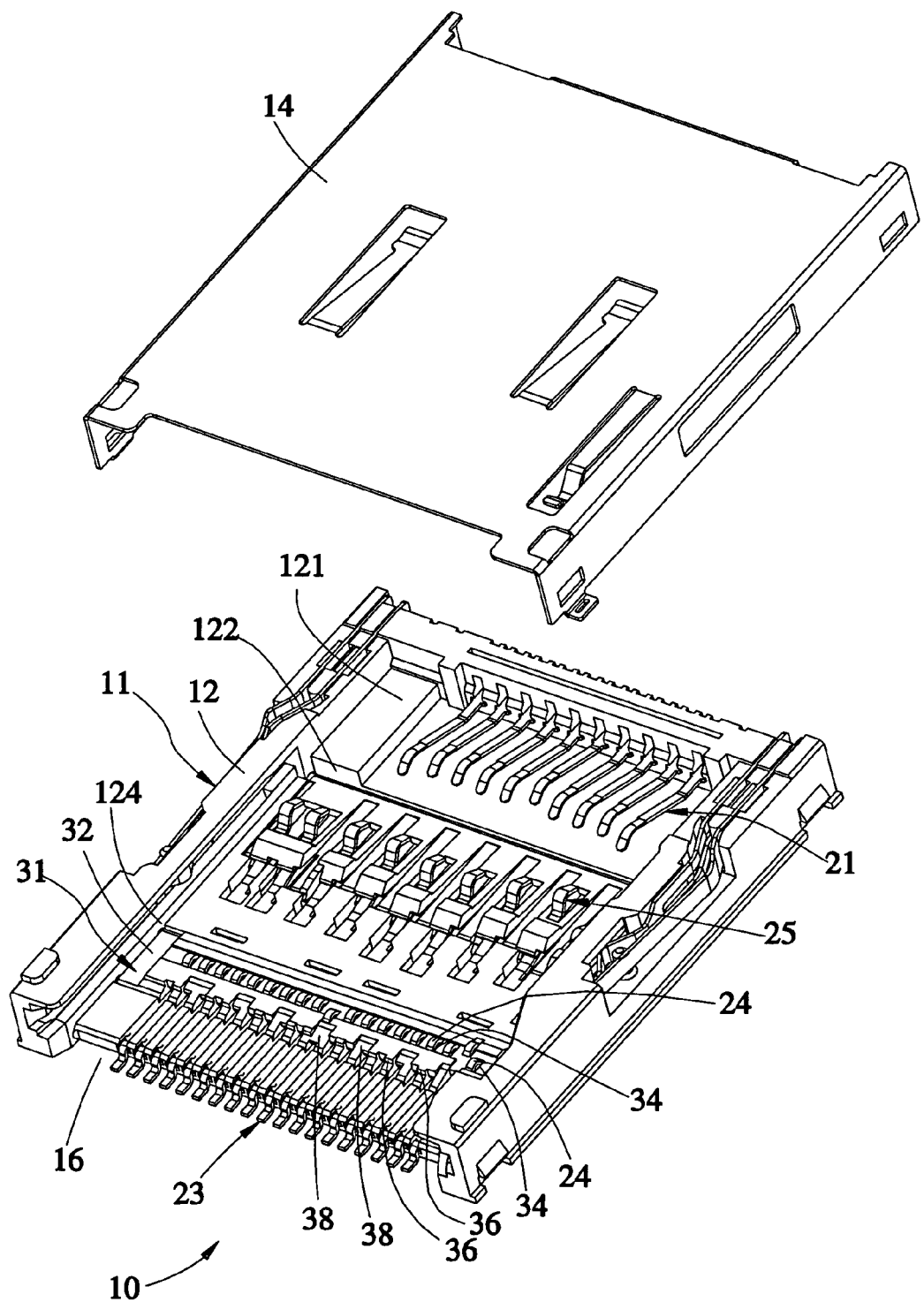
FIG. 2 is a partially exploded view of the preferred embodiment of the present invention, showing a cover is separated from a base.
Figure 3:
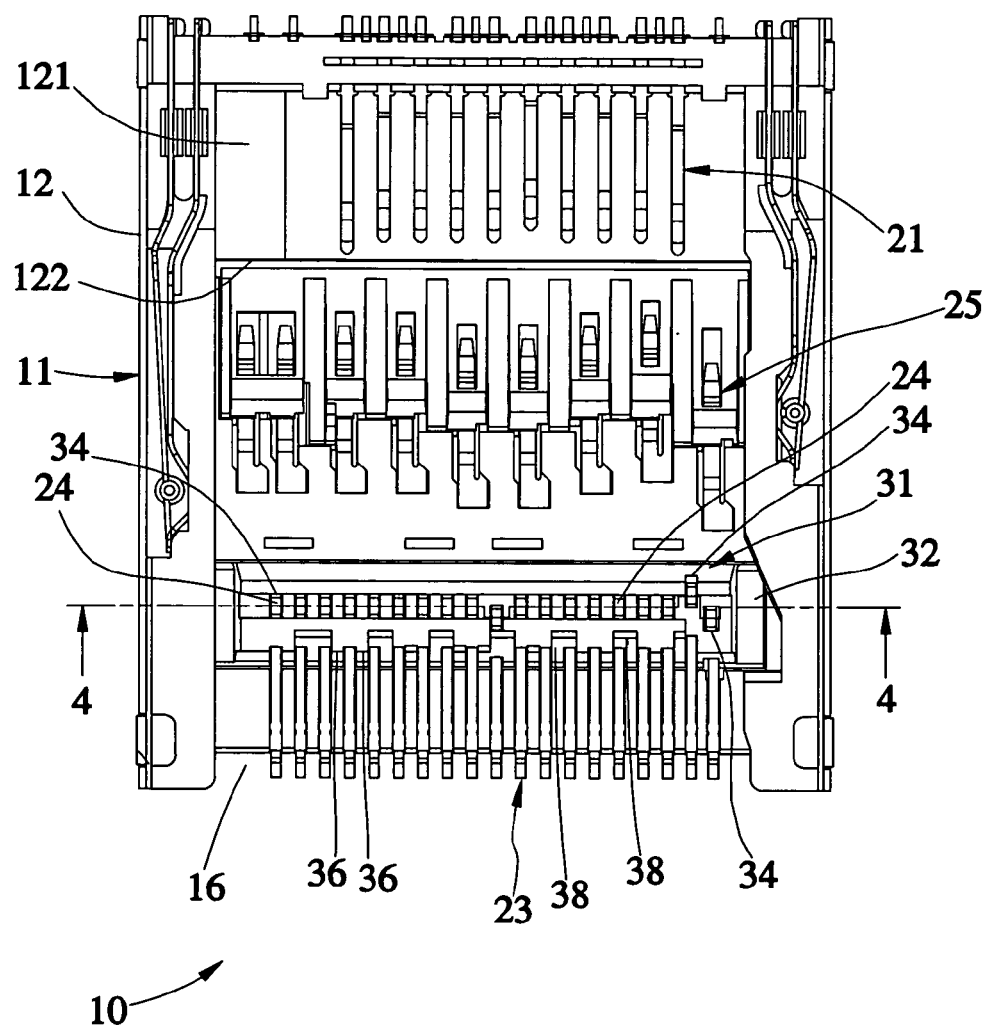
FIG. 3 is a top view of the preferred embodiment of the present invention with the cover removed.
Figure 4:
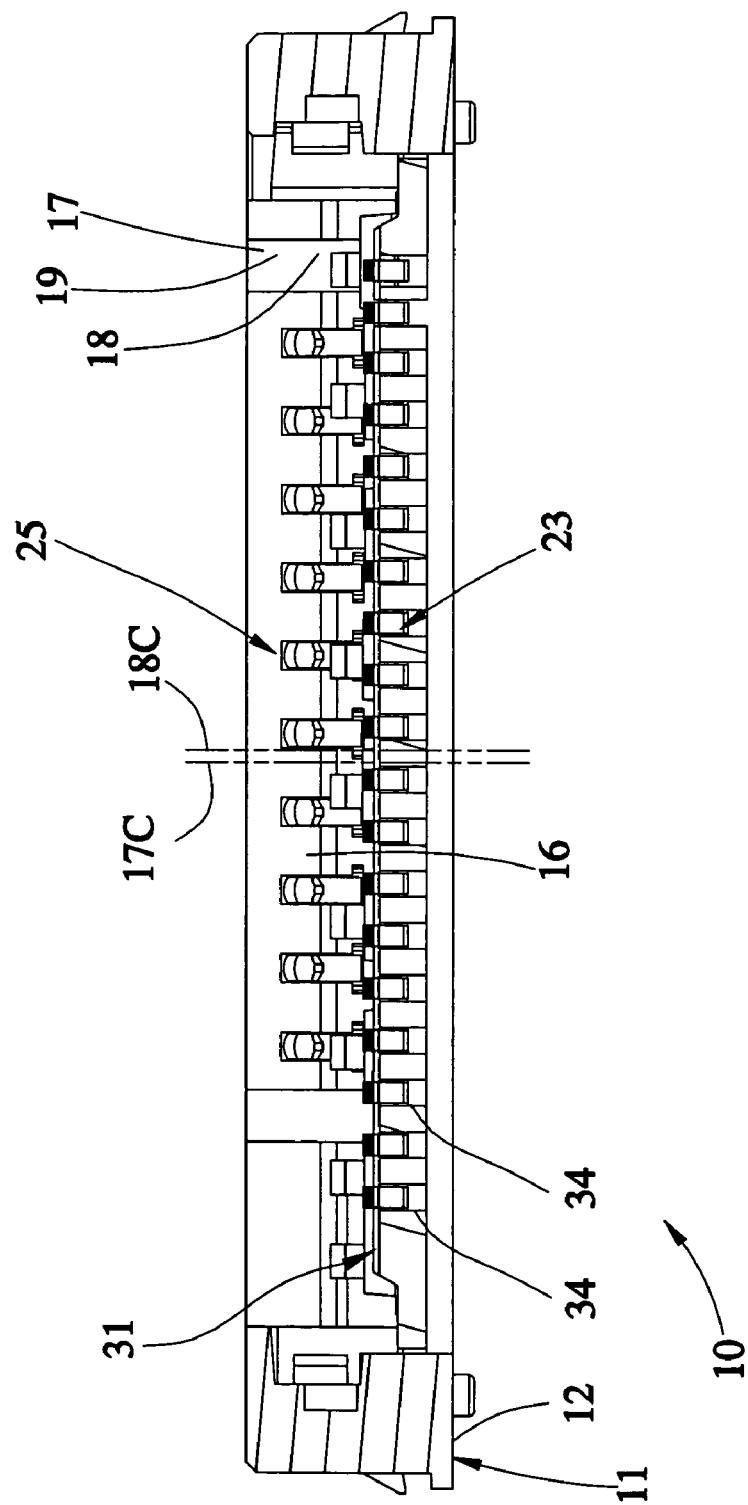
FIG. 4 is a sectional view taken from a line 4—4 indicated in FIG. 3.

Referring to FIGS. 1–7, a card connector 10 capable of avoiding erroneous insertion of an electronic card, constructed according to a preferred embodiment of the present invention is composed of a shell 11 and a pressed plate 31.

The shell 11 includes a base 12 and a cover 14 combined with the base 12, having an opening 16 formed at a front end thereof. Three receiving spaces 17, 18, and 19 are formed in the shell 11, extending inward from the opening 16 and partially overlapping each other, for receiving various kinds of cards, such as MS, MS-DUO, secure digital (SD), multimedia card (MMC), and XD cards. The first receiving space 17 has a center 17c and the second receiving space 18 has a center 18c. As for the direction of card insertion, the center 17c is located a little more sideward (leftward) than the center 18c. Three terminal groups defining a first terminal group 21, a second terminal group 23, and a third terminal group 25 are located at the base 12, extending into inner space of the shell 11. The first terminal group 21 is located at a rear end of the base 12 for electronic connection with the first card 91, which is an MS or MS-DUO card. The second terminal group 23 is located at a front end of the base 12 for electronic connection with the second card 93, which is an XD card, having its body resiliently bending backward and upward. The third terminal group 25 is located at a midsection of the base 12 for electronic connection with the third card 95, which is an SD or MMC card. The base 12 has a stopper 121 at a side of the rear end thereof. The stopper 121 has a stopping point 122 at a front edge thereof. The stopping point 122 is located in front of the first terminal group 21 to contact against the first card 91, which is erroneously inserted, to protect the first terminal group 21 against damage incurred by the impact of the first card 91'.

The pressed plate 31 includes two ends movably mounted to the base 12 to enable at least its front edge to be moved up and down within a section. Two guide channels 124 are formed at bilateral sidewalls of the base 12. The pressed plate 31 includes two guide portions 32 slidably mounted in the two guide channels 124 respectively for upward and downward movement within the section along the guide channels 124, whereby the front edge of the pressed plate 31 can be moved up and down. The pressed plate 31 includes a plurality of slots 34. The second terminal group 23 runs through bottom sides of the slots to be exposed outside a top side of the pressed plate 31 to form a plurality of contact portions 24 for contact with the second card 93. The pressed plate 31 is supported by the second terminal group 23 to be elastically located at upper positions of the guide channels 124 for downward movement driven by an external force and for reposition upon disappearance of the external force. The front edge of the pressed plate 31 has a plurality of upright walls 36 evenly arranged and spaced from each other in a predetermined interval. The upright walls 36 are higher than a surface of the base 12 for 1 mm. The pressed plate 31 includes a plurality of bevels 38 formed at a front side thereof and disposed between the upright walls 36. The first or third card 91 or 95 while inserted can work on the bevels 38 to easily press and pass through over the pressed plate 31.

Figure 5:
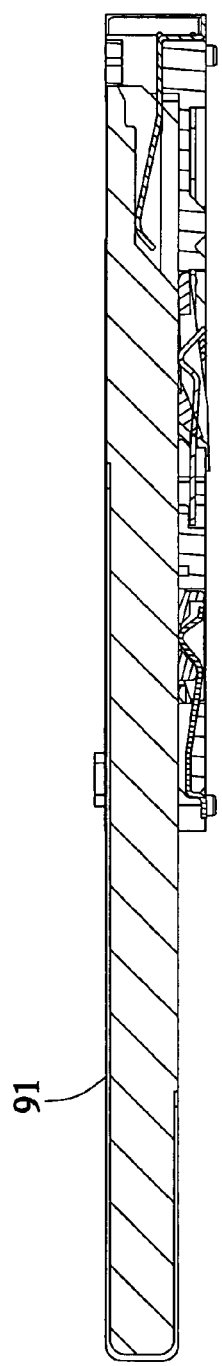
FIG. 5 is a sectional view of the preferred embodiment of the present invention at work, showing that the first card is normally inserted.
Figure 6:
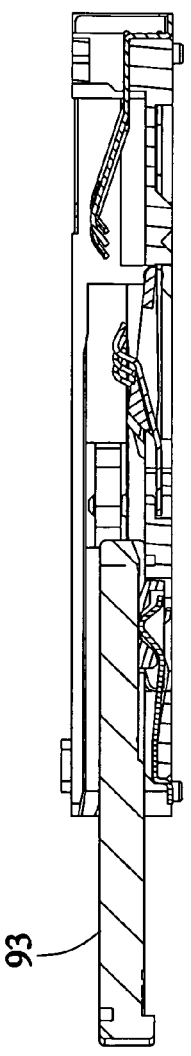
FIG. 6 is a sectional view of the preferred embodiment of the present invention at work, showing that the second card is normally inserted.
Figure 7:
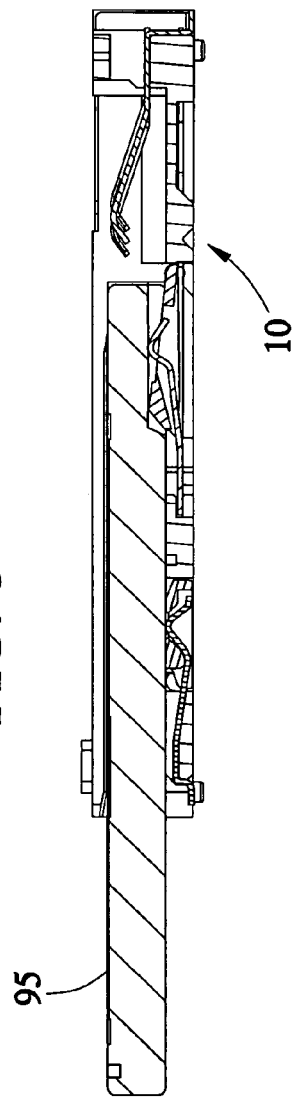
FIG. 7 is a sectional view of the preferred embodiment of the present invention at work, showing that a third card is normally inserted.
Figure 8:
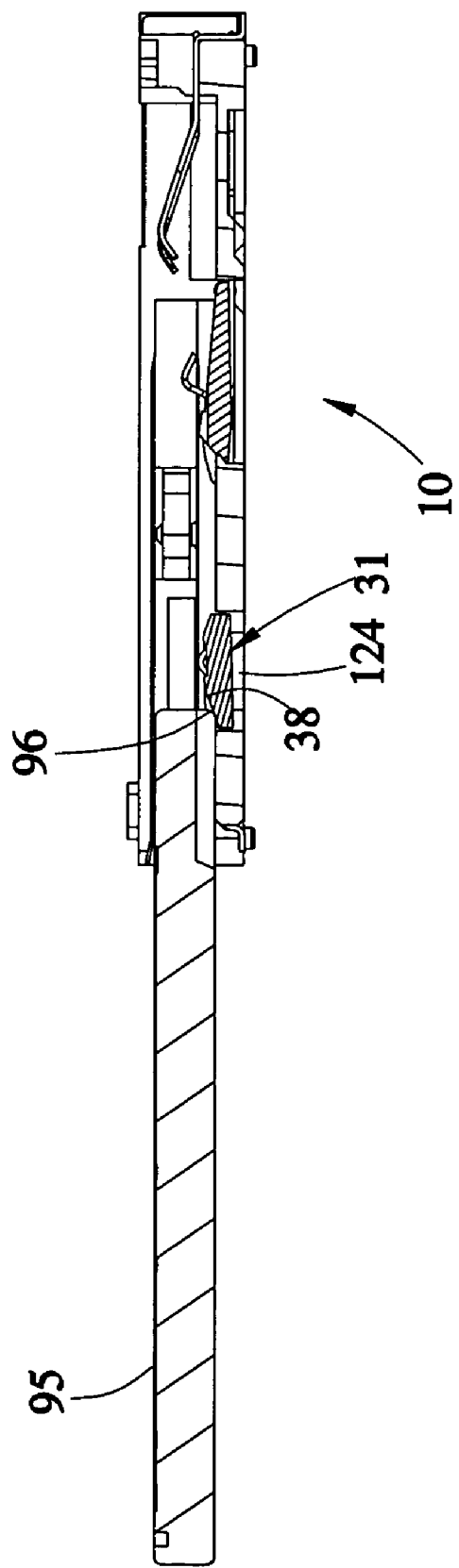
FIG. 8 is similar to FIG. 7, showing that the front edge of the third card works on bevels of the pressed plate.

FIGS. 5–7 show the conditions of normal insertions of the first card 91 (MS card), the second card 93 (XD card), and the third card 95 (SD card) respectively. Referring to FIG. 8, while the third card 95 is inserted, a slope insulator 96 located at a bottom side of a front edge of the third card 95 contacts against the bevels 38 and then climbs the bevels 38 to sink the pressing plate 31 along the two guide channels 124, such that the third card 95 can successfully pass through the pressing plate 31. It is to be noted that the slope insulator 96 is an insulator between the terminals to have a slope surface as the prior art to require no more recitation. In addition, the first card 91 also has a slope insulator (not shown) at a bottom side of a front edge thereof for climbing the bevels 38 while normally inserted. While inserted, the second card 93 directly contacts the contact portions 24 for electronic connection therewith.

Figure 9:
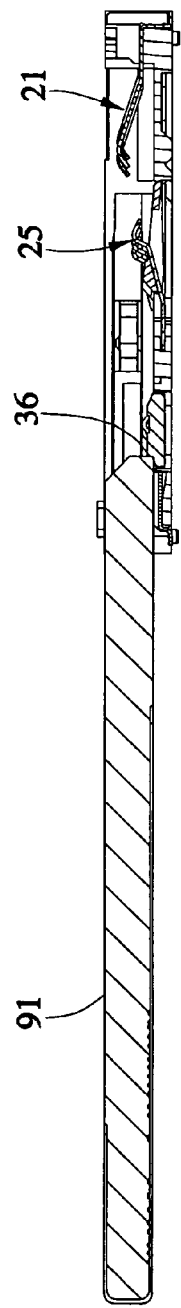
FIG. 9(A) is a sectional view of the preferred embodiment of the present invention at work, showing an erroneous insertion of the first card (MS card) with its opposite side facing upward and its front end facing forward.
FIG. 9(B) is a sectional view of the preferred embodiment of the present invention at work, showing an erroneous insertion of the first card (MS card) with its front side facing upward and its rear end facing forward.
FIG. 9(C) is a sectional view of the preferred embodiment of the present invention at work, showing an erroneous insertion of the first card (MS card) with its opposite side facing upward and its rear end facing forward.
Figure 9:
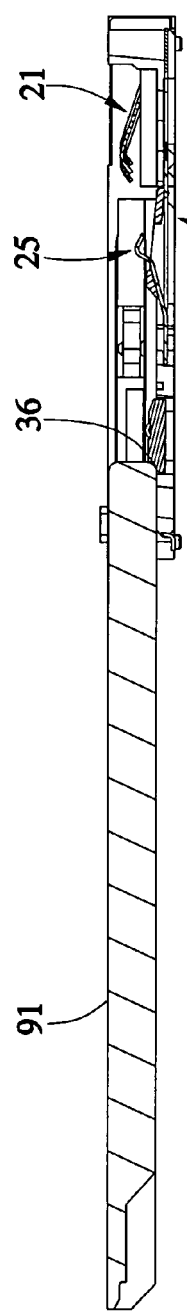
Figure 9C:
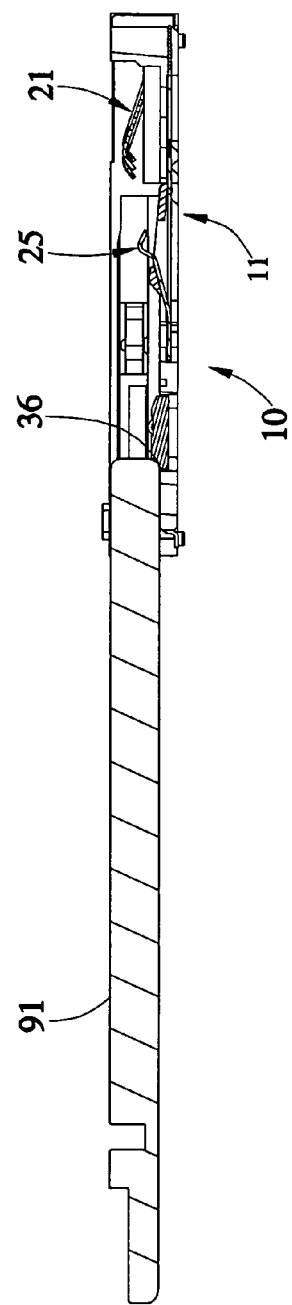

FIGS. 9(A)–(C) show three types of erroneous insertions of the first card 91 with its opposite side facing upward and its front end facing forward, with its front side facing upward and its rear end facing forward, and with its opposite side facing upward and its rear end facing forward respectively. Such erroneous insertions are blocked by the upright walls 36 and then the card 91 fails to enter the shell 11 to protect the first and third terminal groups 21 and 25 from damage of the crash.

FIGS. 10(A)–(C) show three types of erroneous insertions of the first card 91' with its opposite side facing upward and its front end facing forward, with its front side facing upward and its rear end facing forward, with its opposite side facing upward and its rear end facing forward. Such erroneous insertions are likewise blocked by the upright walls 36 and then the card 91' fails to enter the shell 11 to protect the first and third terminal groups 21 and 25 from damage of the crash.

Figure 11:
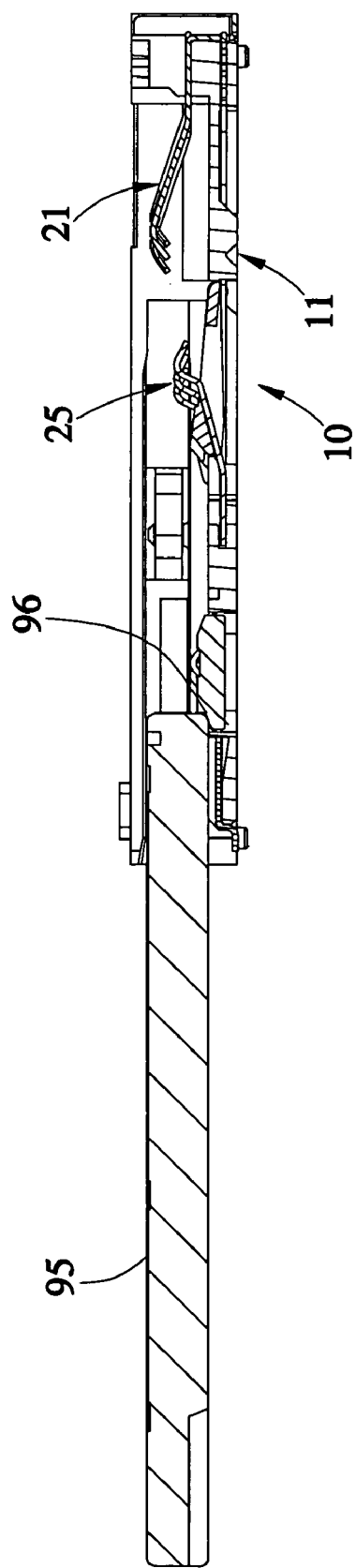
FIG. 11 is a sectional view of the preferred embodiment of the present invention at work, showing an erroneous insertion of the third card with its front side facing upward and its rear end facing forward.

FIG. 11 shows an erroneous insertion of the third card 95 with its front side facing upward and its rear end facing forward. Such erroneous insertions are likewise blocked by the upright walls 36 and then the card 95 fails to enter the shell 11 to protect the third terminal group 25 from damage of the crash.

Figure 12:
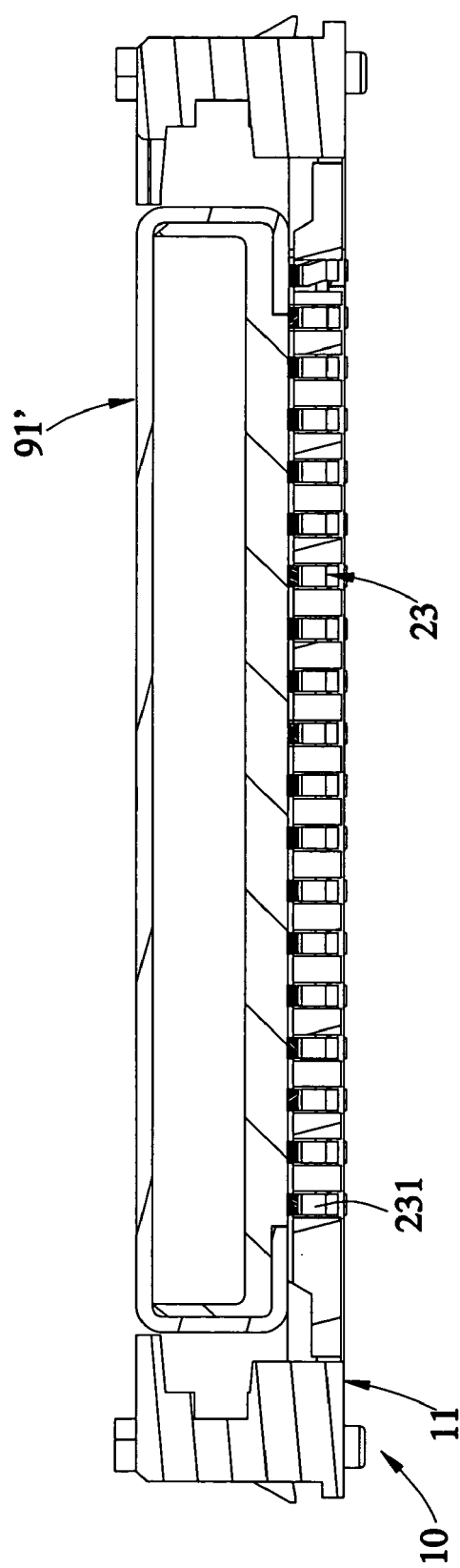
FIG. 12 is similar to FIG. 4, showing the relationship of electronic connection between the second terminal group and the first card (MS-DUO card) while normally inserted.

As for the direction of the card insertion, the center 17c of the first receiving space 17 is located in slightly sideward deviation while comparing with the center 18c of the second receiving space 18. Thus, as shown in FIG. 12, while the first card 91' is normally inserted, metallic surfaces located at bilateral sides of the bottom side of the card 91' are spaced from the second terminal group 23 to avoid contact with a power terminal 231 of the second terminal group 23 and avoid short circuit incurred thereby.

Figure 13:
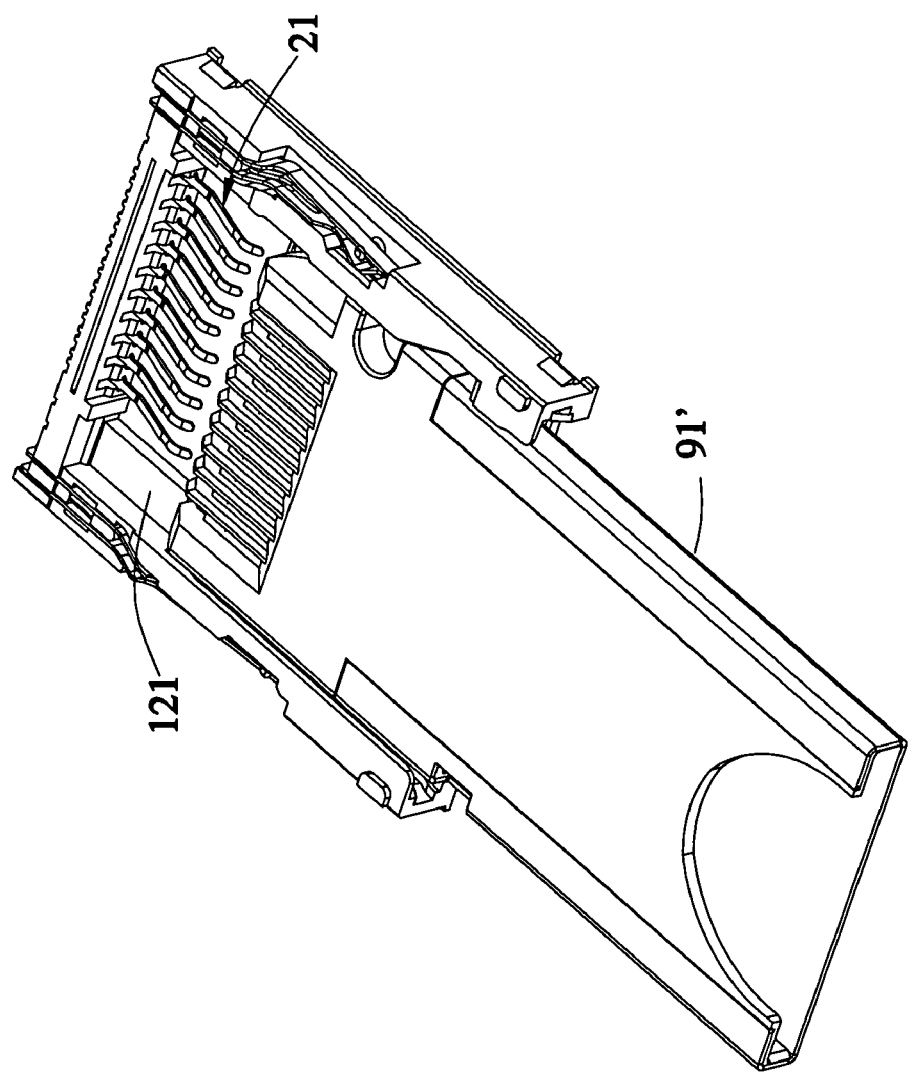
FIG. 13 is a perspective view of the preferred embodiment of the present invention at work, showing the interrelationship between a stopper and the first card (MS-DUO card) inserted with its opposite side facing upward and its front end facing forward.
Figure 14:
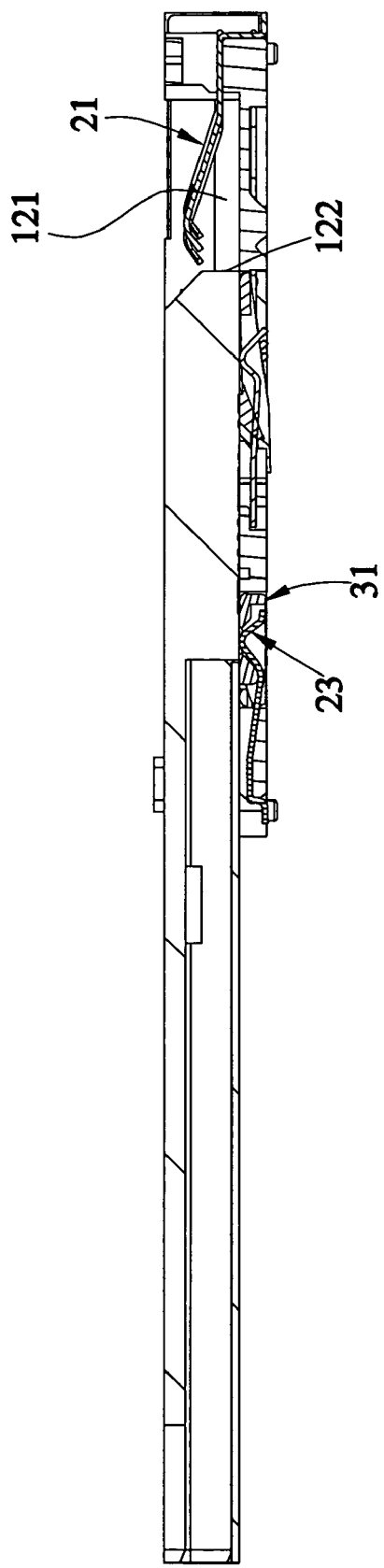
FIG. 14 is a longitudinal sectional of FIG. 13, showing the relationship among the stopper, the second terminal group, and the first card (MS-DUO card) inserted with its opposite side facing upward and its front end facing forward.

Referring to FIGS. 13 and 14, while the first card 91' is pushed to break into the card connector 31 and then run through the pressed plate 31, the first card 91' contacts against the stopping point 122 of the stopper 121 and fails to enter the shell 11, thereby protecting the first terminal group 21 from damage of the crash. Referring to FIG. 14, the metallic surfaces of the first card 91' do not contact the second terminal group 23 to avoid short circuit.

In conclusion, the present invention includes advantages as follows.

1. Prevent erroneous card insertion: The upright walls 36 can effectively block various erroneous insertions of various kinds of cards to prevent the cards from being pushed further resulting in crashing into the terminals, thus avoiding damage and malfunction of the card connector.

2. Prevent short circuit: The correlative deviation of the centers of the first and second receiving spaces 17 and 18 prevents the metallic surfaces of the first card 91' normally inserted into the card connector 10 from contact with the power terminal of the second terminal group 23 to further avoid short circuit. Furthermore, the stopper 121 can block the first card 91' with its front side facing upward and its front end facing forward from being inserted for a predetermined depth and to prevent the metallic surfaces of the card from contact with the second terminal group 23, thus also avoiding short circuit.

It is to be noted that the elements indicated in the above-mentioned embodiment are for illustration only but not to limit the scope of the claim of the present invention and they can be interchanged by equal elements for the same objectives.

What is claimed is:

1. A card connector capable of avoiding erroneous insertion of an electronic card, comprising:

a shell having an opening and at least two receiving spaces, said opening being formed at a front end of said shell, said at least two receiving spaces extending inward from said opening and overlapping each other for receiving at least two kinds of electronic cards, at least two terminal groups being mounted to said shell and extending into said shell, two of said at least two terminal groups being defined as a first terminal group and a second terminal group, said first terminal group being located at a rear end inside said shell for electronic connection with a first card, said second terminal group being located at a bottom side of a front end inside said shell and having a body resiliently bending backward and upward for electronic connection with a second card; and a pressed plate having two ends thereof movably mounted in said shell to enable a front edge thereof to be moved up and down within a section, said pressed plate having a plurality of slots, said body of said second terminal group running upward through bottom sides of said slots to be exposed outside a top side of said pressed plate to form a plurality of contact portions, said pressed plate being supported by said body of said second terminal group to be located at an upper position of said section, a plurality of upright walls transversely arranged and spaced from each other in a predetermined interval being formed at the front edge of said pressed plate.

2. The card connector as defined in claim 1, wherein said upright walls are evenly arranged at the front edge of said pressed plate.

3. The card connector as defined in claim 1, wherein said pressed plate has a plurality of bevels formed at the front edge thereof and disposed around said upright walls.

4. The card connector as defined in claim 1, wherein said shell is composed of a base and a cover mounted on said base.

5. The card connector as defined in claim 4, wherein each of said upright walls has a top side, said top sides of said upright walls being higher than a surface of said base.

6. The card connector as defined in claim 5, wherein said upright walls are higher than the surface of the base by 1 mm.

7. The card connector as defined in claim 1, wherein said shell has two guide channels formed vertically at bilateral sidewalls inside said shell; said pressed plate has two guide portions formed at bilateral ends thereof for slidable upward and downward movement along said two guide channels.

8. The card connector as defined in claim 1, wherein said shell has a stopper mounted therein.

9. The card connector as defined in claim 1, wherein two of said at least two receiving spaces is defined as a first receiving space and a second receiving space, each of said first and second receiving spaces having a center, the center of said first receiving space being located in slightly sideward deviation while comparing with the center of the second receiving space.

10. The card connector as defined in claim 1, wherein said first card is a memory stick (MS) or MS-DUO card; said second card is an extreme digital (XD) card.

* * * * *